US011112300B2

(12) United States Patent
Etschmaier et al.

(10) Patent No.: US 11,112,300 B2
(45) Date of Patent: Sep. 7, 2021

(54) OPTICAL SENSOR PACKAGE AND METHOD OF PRODUCING SAME

(71) Applicant: ams AG, Premstaetten (AT)

(72) Inventors: Harald Etschmaier, Premstaetten (AT); Klaus Schmidegg, Premstaetten (AT)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 16/633,509

(22) PCT Filed: Jul. 18, 2018

(86) PCT No.: PCT/EP2018/069549
§ 371 (c)(1),
(2) Date: Jan. 23, 2020

(87) PCT Pub. No.: WO2019/020470
PCT Pub. Date: Jan. 31, 2019

(65) Prior Publication Data
US 2020/0225085 A1    Jul. 16, 2020

(30) Foreign Application Priority Data
Jul. 27, 2017    (EP) .................................... 17183544

(51) Int. Cl.
*G01J 1/04*    (2006.01)
(52) U.S. Cl.
CPC ........... *G01J 1/0474* (2013.01); *G01J 1/0437* (2013.01)
(58) Field of Classification Search
CPC ...... G01J 1/0209; G01J 1/0437; G01J 1/0474; G01J 1/0492; G01J 1/0266; G01J 1/4204; G01J 3/0205
See application file for complete search history.

(56) References Cited

U.S. PATENT DOCUMENTS

2005/0024729 A1*   2/2005   Ockerse ............... G02B 5/0221
                                                              359/603
2007/0170449 A1*   7/2007   Anandan .................. G01J 3/50
                                                               257/98

(Continued)

FOREIGN PATENT DOCUMENTS

CN    106969830 A    7/2017
GB      582511      11/1946

(Continued)

OTHER PUBLICATIONS

European Patent Office, International Search Report for PCT/EP2018/069549 dated Nov. 19, 2018.

(Continued)

*Primary Examiner* — Sang H Nguyen
(74) *Attorney, Agent, or Firm* — MH2 Technology Law Group LLP

(57) ABSTRACT

The optical sensor package comprises an optical sensor device with a sensor element arranged inside a housing comprising a cap. A diffuser is arranged in an aperture of the cap opposite the sensor element and prolongs the cap in the aperture or closes the aperture. The method comprises forming a cap with an aperture, arranging a diffusing material in the aperture, thus forming a diffuser, and after forming the diffuser, arranging an optical sensor device with a sensor element inside a housing that includes the cap, such that the sensor element is opposite the diffuser.

13 Claims, 1 Drawing Sheet

(56) References Cited

U.S. PATENT DOCUMENTS

| | | | |
|---|---|---|---|
| 2009/0046219 A1 | 2/2009 | Bell et al. | |
| 2010/0283394 A1 | 11/2010 | Ong | |
| 2012/0132788 A1 | 5/2012 | Findlay | |
| 2012/0170284 A1* | 7/2012 | Shedletsky | G01J 1/0407 |
| | | | 362/355 |
| 2012/0250022 A1 | 10/2012 | Zhou et al. | |
| 2014/0231635 A1* | 8/2014 | Kerness | H01L 31/02325 |
| | | | 250/226 |
| 2014/0268138 A1* | 9/2014 | Yokino | G01J 3/2803 |
| | | | 356/326 |
| 2015/0102212 A1* | 4/2015 | Ruh | H01L 31/02327 |
| | | | 250/237 R |
| 2015/0109775 A1* | 4/2015 | Schwalenberg | F21K 9/61 |
| | | | 362/231 |
| 2015/0340397 A1* | 11/2015 | Seo | H01L 27/14623 |
| | | | 257/432 |
| 2016/0054175 A1 | 2/2016 | Jia et al. | |
| 2016/0232828 A1 | 8/2016 | Jia et al. | |
| 2017/0089757 A1* | 3/2017 | Geiger | G01J 1/06 |
| 2017/0122799 A1* | 5/2017 | Okudo | G01J 5/0831 |
| 2018/0226514 A1* | 8/2018 | Etschmaier | H01L 31/173 |
| 2018/0323320 A1* | 11/2018 | Mehrl | G02B 19/0076 |

FOREIGN PATENT DOCUMENTS

| | | |
|---|---|---|
| JP | H02-268456 | 11/1990 |
| JP | H05-276521 | 2/1993 |

OTHER PUBLICATIONS

Office Action dated Jul. 18, 2018 for corresponding Chinese Application No. 2018800459061, 16 pages.

\* cited by examiner

OPTICAL SENSOR PACKAGE AND METHOD OF PRODUCING SAME

BACKGROUND OF THE INVENTION

Color sensors with XYZ filters (tristimulus colour values according to CIE) allow very precise measurements, if the direction of the incident radiation does not essentially deviate from a preferred direction. On the other hand, the field of view of a sensor may be desired to be wide, corresponding to a large solid angle of incidence.

US 2012/0250022 A1 discloses a hand-held color measurement device with an aspherical input lens, an aperture in the focal plane of the input lens for limiting the incident angular range, a depolarizing diffuser, a sensor lens and sensors with color filters. The diffuser is arranged in the vicinity of the aperture and in the focal plane of the sensor lens. The filters and the sensors are arranged close to the optical axis and exposed to substantially parallel light rays. The filters are adapted to the tristimulus color values XYZ according to CIE. For ambient light measurements, an additional diffuser can be placed in front of the input lens.

US 2016/0054175 A1 discloses a light sensor window for an electronic device in a housing in which a display with a transparent layer is mounted. An opaque masking layer, such as a layer of black ink, covers an inner surface of the transparent layer. Windows in the opaque masking layer allow light from outside to enter the device. A diffuser structure, such as a polymer layer with light-scattering particles, voids or hollow particles, is arranged in the windows and helps scatter light towards an integrated light sensor.

SUMMARY OF THE INVENTION

The optical sensor package comprises an optical sensor device with a sensor element arranged inside a housing comprising a cap. A diffuser is arranged in an aperture of the cap opposite the sensor element and prolongs the cap within the aperture or closes the aperture.

In embodiments of the optical sensor package, the diffuser comprises an epoxy resin or silicone. In further embodiments of the optical sensor package, the cap comprises a liquid-crystal polymer, a polyphenylene sulfide or a metal.

Further embodiments of the optical sensor package comprise a cover of the optical sensor device. The cover is arranged at a positive distance from the diffuser and has a refractive index greater than a refractive index that is present between the cover and the diffuser by a factor of at least 1.5 for at least one wavelength that is to be detected. In particular, the positive distance may be adjusted with respect to the cover such that a maximal angle of incidence of 40° is obtained at the sensor element for radiation of at least one wavelength that is to be detected.

In further embodiments of the optical sensor package, the cap is tapered towards the diffuser.

The method of producing an optical sensor package comprises forming a cap with an aperture, arranging a diffusing material in the aperture, thus forming a diffuser, and after forming the diffuser, arranging an optical sensor device with a sensor element inside a housing that includes the cap, such that the sensor element is opposite the diffuser.

Epoxy resin or silicone can especially be used for the diffusing material, and liquid-crystal polymer, polyphenylene sulfide or metal can especially be used for the cap.

The cap and the diffuser may be formed by injection molding, using an opaque material for the cap and a diffusing material for the diffuser.

BRIEF DESCRIPTION OF THE DRAWINGS

The following is a detailed description of examples of the optical sensor package and the method of production in conjunction with the appended figures.

DETAILED DESCRIPTION

Figure 1:
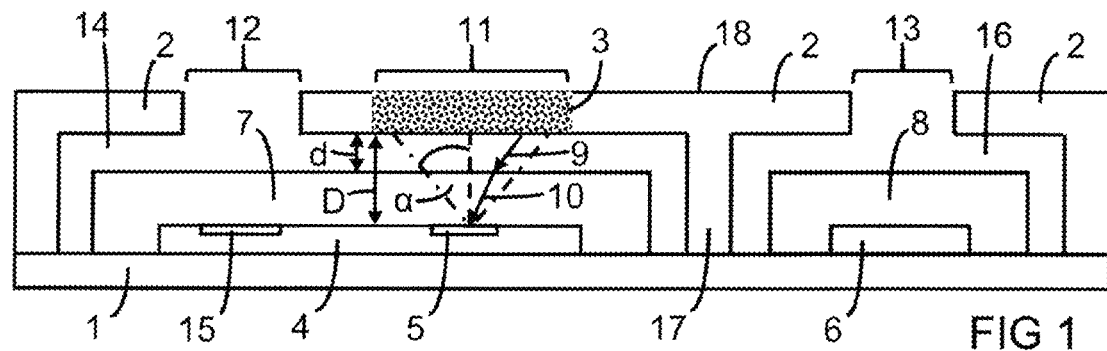
FIG. 1 is a cross-section of an optical sensor package.

FIG. 1 is a cross-section of an optical sensor package. A housing is formed by a board 1 and a cap 2, which is mounted on the board 1. A diffuser 3 is arranged in the cap 2. An optical sensor device 4 with a sensor element 5 is mounted in a compartment 14 formed inside the housing 1, 2, so that the sensor element 5 is opposite the diffuser 3 and is able to receive electromagnetic radiation penetrating the diffuser 3. The optical sensor device 4 may be embedded in a cover 7, which may especially be a transparent or semi-transparent molding compound, for instance.

The cap 2 comprises an aperture 11. The diffuser 3 is arranged in the aperture 11, so that it prolongs the cap 2 inside the aperture 11 and thus complements the shape of the cap 2. The diffuser 3 may in particular close the aperture 11. The cap 2 may especially comprise an opaque material. The diffuser 3 comprises a diffusing material, which may include an epoxy resin or silicone.

In the example shown in FIG. 1, the optical sensor device 4 comprises a further sensor element 15, and the cap 2 comprises a further aperture 12 above the further sensor element 15. The sensor element 5 may be provided for an ambient light sensor, for instance, while the further sensor element 15 may be provided for a proximity sensor. In this example, the further aperture 12 need not be provided with a further diffuser. In embodiments that are intended for different applications, the further aperture 12 may be provided with a further diffuser, which prolongs or closes the cap 2 inside the further aperture 12 and thus complements the shape of the cap 2 in a manner similar to the diffuser 3 in the aperture 11.

A further compartment 16 may be formed in the housing 1, 2, as shown in FIG. 1. A further optical device 6, which may especially comprise a light source like an LED, for instance, can be arranged in the further compartment 16. The opaque inner wall 17 of the cap 2 that is present between the compartment 14 and the further compartment 16 shields the emitted light from the sensor element 5 and the further sensor element 15. The further optical device 6 may be embedded in a further cover 8, which may especially be a transparent or semitransparent molding compound, for instance.

Above the further optical device 6, the cap 2 comprises a further aperture 13, which allows light emitted by the further optical device 6 to exit the housing 1, 2. In this example, the further aperture 13 need not be provided with a further diffuser. In embodiments that are intended for different applications, the further aperture 13 may be provided with a further diffuser as well.

The optical sensor package according to FIG. 1 forms a kind of module, which can be used for ambient light sensing and also for proximity sensing by detecting a portion of the emitted light that is reflected from an object and received by the further sensor element 15, for example. A large variety of optical sensor modules can be obtained by varying the number of apertures, the number of compartments, and the arrangement of optical devices inside the housing 1, 2.

FIG. 1 shows an example of the path of a light ray that has entered the compartment 14 after passing the diffuser 3. The light ray 9, 10 is indicated by arrows.

The cover 7 has an upper surface that is at a distance d from the diffuser 3. The gap between the diffuser 3 and the cover 7 may be filled with air, for instance. Hence a value of approximately 1 may be assumed for the refractive index in the gap. The cover 7 may be formed from a clear molding compound having a refractive index that is typically greater than 1.5 for at least one wavelength that is to be detected. The wavelength may especially be 589 nm, which is used in standard refractive index measurements. Thus the cover has a refractive index greater than a refractive index that is present between the cover and the diffuser by a factor of at least 1.5 for at least one wavelength that is to be detected.

FIG. 1 shows an incident ray 9 and a refracted ray 10, which propagates towards the sensor element 5 after refraction at the surface of the cover 7. By Snell's law, the ratio of the sines of the angles of incidence and refraction is equivalent to the reciprocal of the ratio of the refractive indices. Hence the incident ray 9 emerging from the diffuser 3 is refracted towards the sensor element 5, and the angle of incidence on the cover 7 is greater than the angle of incidence on the sensor element 5 according to Snell's law.

If the ratio of the refractive indices is assumed to be 1.56, which is typical for a clear molding compound and for a wavelength within the range of wavelengths to be detected, the maximal angle of incidence a is approximately 40°. The maximal angle of incidence a is half the apex angle of the cone defining the solid angle of the field of view that is obtained by the aperture 11 including the diffuser 3.

The path of the light ray shown in FIG. 1 illustrates how the distance d between the diffuser 3 and the surface of the cover 7 and the distance D between the diffuser 3 and the sensor element 5 can be adjusted to obtain a desired field of view. Fresnel's equations, which describe the dependence of the reflection coefficient on the angle of incidence, may also be considered in this respect. The percentage of the incident radiation that is reflected instead of being refracted increases with the angle of incidence. Furthermore, the thickness of the diffuser 3 and the concentration of scattering particles in the diffusing material can be adapted to tune the amount of transmission vs. scattering.

Figure 2:
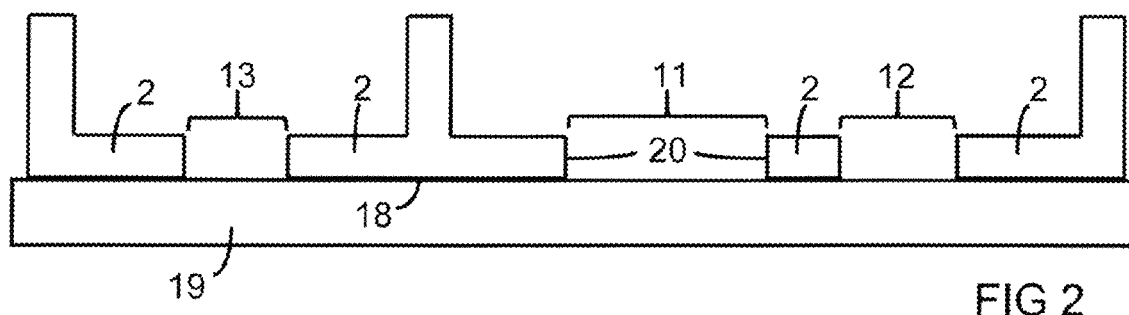
FIG. 2 shows a stage of the method of production before the diffuser is formed.

FIG. 2 is a cross-section illustrating a stage of the method of production. The cap 2 is formed from a suitable material, in particular an opaque material, which may especially be a liquid-crystal polymer, polyphenylene sulfide or a metal, for instance. The cap 2 is provided with the desired apertures 11, 12, 13, including the aperture 11 that is intended for the diffuser 3. The cap 2 is then fastened upside down on a carrier 19, so that the upper surface 18 of the cap 2 is supported by the carrier 19. The lateral surface 20 of the cap 2 facing the aperture 11 may be structured to facilitate or strengthen the attachment of the diffuser 3.

Figure 3:
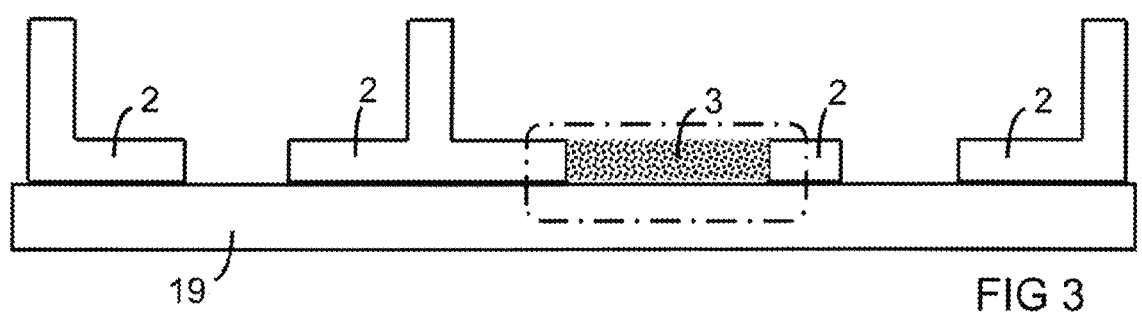
FIG. 3 shows a stage of the method of production after the diffuser is formed.

The aperture 11 is filled with a diffusing material. This may especially be accomplished by dispensing epoxy resin or silicone. FIG. 3 is a cross-section according to FIG. 2 after the diffuser 3 is formed. In FIG. 3, the diffuser 3 is shown to have the same or approximately the same thickness as the cap 2. The thickness of the diffuser 3 may instead deviate from the thickness of the cap 2.

Injection molding of two components may also be employed for the production of the cap 2 with the diffuser 3. The components may include an opaque material, in particular a black material, and a diffusing material, in particular a white material.

Figure 4:
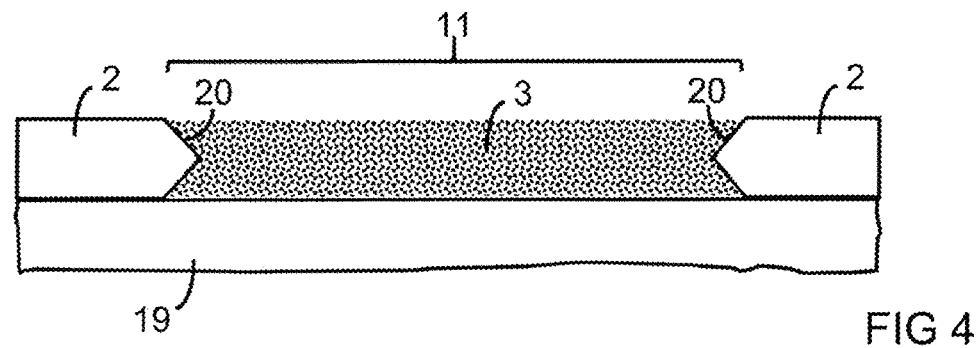
FIG. 4 is a detail of FIG. 3 including the diffuser.

FIG. 4 is a detail of FIG. 3 including the diffuser 3. The section shown in FIG. 4 is indicated in FIG. 3 by a dotted frame. FIG. 4 shows how the lateral surface 20 of the cap 2 facing the aperture 11 may be provided with a structural feature like a taper, for instance, which interlocks the diffuser 3 and the cap 2 to avoid delamination. Chemical bonding is also a suitable option.

The described optical sensor package allows to combine a color sensor and a proximity sensor. If the apertures provided for the color sensor and the proximity sensor are spatially separated, as in the example according to FIG. 1, the diffuser can be restricted to the color sensor in order to avoid a loss of signal intensity in the proximity sensor. For applications in which the signal intensity is not critical, it may be suitable to arrange both the color sensor and the proximity sensor under a common aperture, which may partially or completely be filled with diffuser material.

The described optical sensor package with integrated diffuser provides a relatively wide field of view together with an appropriate restriction of the maximal angle of light incidence. It does not require external components and enables the calibration of the sensor during a final test.

The invention claimed is:

1. An optical sensor package, comprising:
   an optical sensor device with a sensor element,
   a cover of the optical sensor device, and
   a housing comprising a cap with an aperture, the optical sensor device being arranged inside the housing,
   a diffuser is arranged in the aperture opposite the sensor element,
   the diffuser prolongs the cap within the aperture or closes the aperture, and
   the cover being arranged at a distance from the diffuser, wherein the distance is adjusted with respect to the cover in such a manner that a maximal angle of incidence of 40° is obtained at the sensor element for radiation of at least one wavelength that is to be detected.

2. The optical sensor package of claim 1, wherein the diffuser comprises an epoxy resin.

3. The optical sensor package of claim 1, wherein the diffuser comprises silicone.

4. The optical sensor package of claim 1, wherein the cap comprises a liquid-crystal polymer.

5. The optical sensor package of claim 1, wherein the cap comprises a polyphenylene sulfide.

6. The optical sensor package of claim 1, wherein the cap comprises a metal.

7. The optical sensor package of claim 1,
   wherein the cover has a refractive index greater than a refractive index that is present between the cover and the diffuser by a factor of at least 1.5 for at least one wavelength that is to be detected.

8. The optical sensor package of claim 1, wherein a lateral surface of the cap facing the aperture is provided with a structural feature.

9. The optical sensor package of claim 8, wherein the lateral surface is tapered towards the diffuser.

10. A method of producing an optical sensor package, comprising:
   forming a cap with an aperture,
   arranging a diffusing material in the aperture, thus forming a diffuser, and
   after forming the diffuser, arranging an optical sensor device with a sensor element inside a housing that includes the cap, such that the sensor element is opposite the diffuser, wherein the optical sensor device comprises a cover that is arranged at a distance from the diffuser, and wherein the distance is adjusted with respect to the cover in such a manner that a maximal angle of incidence of 40° is obtained at the sensor element for radiation of at least one wavelength that is to be detected.

11. The method of claim 10, wherein an epoxy resin or silicone is used for the diffusing material.

12. The method of claim 10, wherein a material selected from the group consisting of liquid-crystal polymer, polyphenylene sulfide and metal is used for the cap.

13. The method of claim 10, further comprising:
   forming the cap and the diffuser by injection molding, using an opaque material for the cap and a diffusing material for the diffuser.

* * * * *